United States Patent Office 3,463,606
Patented Aug. 26, 1969

3,463,606
SEPARATION OF LITHIUM ISOTOPES
Wilhelm Matthijs Smit, Amsterdam, and Gerardus Johannes Arkenbout, Utrecht, Netherlands, assignors to Nederlandse Centrale Organisatie voor Toegepast-natuurwetenschappelijk Onderzoek (Centrale Organization T.N.O.), The Hague, Netherlands, a corporation of the Netherlands
Filed June 3, 1965, Ser. No. 467,806
Int. Cl. C01d *11/02;* B01d *59/30*
U.S. Cl. 23—89                    6 Claims

ABSTRACT OF THE DISCLOSURE

A process for enriching lithium isotopes with an exchange column having a return circuit at the upper end and a return circuit at the lower end in which lithium amalgam is contacted with a lithium salt dissolved in an organic amine solvent.

Prior art

Figure 1:
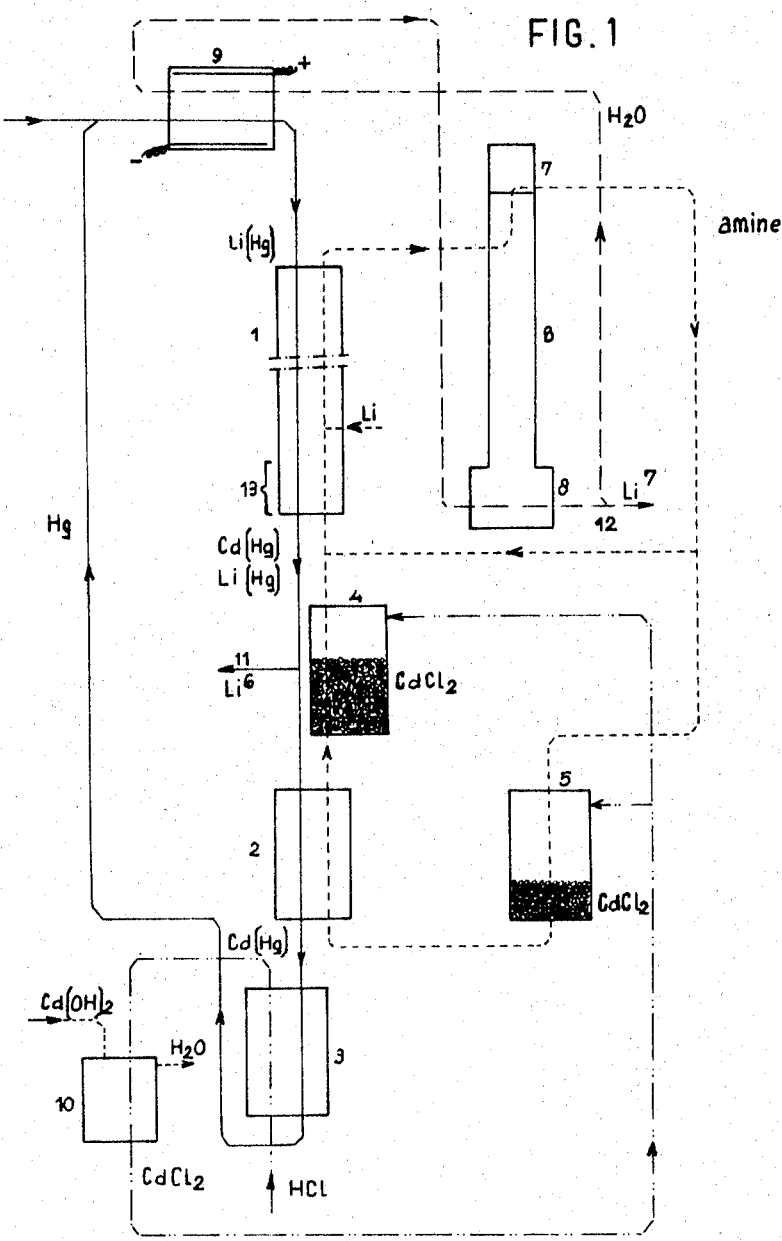

The general principle for the separation of metals that are closely related chemically, particularly of the lithium isotopes $Li^6$ and $Li^7$ with the aid of the selective distribution of the two metals over two liquids which are in contact with each other, has been described by Lewis and Macdonald (J. Am. Chem. Soc., 58, pp. 2519–2524 (1936)). Lithium amalgam is mentioned as the one liquid and a solution of lithium chloride or bromide in an organic liquid such as an anhydrous alcohol, dioxane or mixtures of these, are mentioned as the other liquid.

The liquids are brought into contact with one another in an exchange column in counterflow. A return should be used at least at one side, just as in charge-wise fractionating distillation. Further, it is also possible, also in comparison with distillation, to use return on both sides. If a supply (feed) is provided at a suitable point between its two ends, such a column will be capable of a continuous delivery of products both at the top and at the bottom side. The amalgam fraction that leaves the column is enriched in lithium-6.

The lithium in the amalgam is converted into lithium salt at that side of the column, at which amalgam is being drained off (to be indicated hereinafter as the lower side of the column), the said salt being subsequently redissolved in the solvent, after which this solution is introduced again at or near the lower side of the column.

The reverse process is carried out at the upper side of the column.

Lewis and Macdonald have applied a discontinuous process at the lower side to effect the return. They made an attempt to extract the lithium from the amalgam by means of exchange with a solution of a corresponding salt of some heavy metal such as zinc. These attempts proved unsuccessful, mainly owing to the fact that the auxiliary metal did not enter the amalgam, but precipitated. After this, the lithium was transferred into the solvent with the aid of an acid.

In the exchange column proper (length 18 m., diameter 4 mm.), the amalgam drops were added to the salt solution at the upper side and were drained off at the lower side and subsequently analyzed and converted into lithium salt, which was pumped from below upwards as a solution (in the dissolved state).

In another known method dimethyl formamide is recommended as a solvent for the lithium salt whereby a complex series of processes is required for the transmission of the lithium from the amalgam to the organic liquid, and the reverse process also is of a complex nature. A further known method makes use of water instead of an organic solvent, thereby suppressing the decomposition of the amalgam by the water as much as possible by providing a potent difference between the amalgam and the water.

Objects of the invention

An object of the invention is to provide a method in which the exchange process can be carried out with continuous return sections at both sides of the exchange column.

Another object of the invention is to provide a suitable organic solvent so that the complexity of the return circuit is reduced.

A further object of the invention is to provide for a suitable exchange column with reduced length.

Further objects of the invention will appear from the description below.

The invention

Now, it has been found that, in using the said separating method, an amine or a mixture of amines having a boiling point below 100° C. is very satisfactory as an organic liquid. Ethylamine may be used, but it is preferred to use propylamine and/or isopropylamine.

The said amines show the following favourable combination of properties:

(a) good solubility for lithium halogenides;
(b) resistance with respect to lithium amalgam (no development of $H_2$);
(c) good rate of exchange between dissolved lithium salt and the amalgam;
(d) the elementary separation factor of the isotopes when amalgam and salt solution are in equilibrium is clearly different from 1;
(e) no tendency to the formation of emulsion with mercury or amalgam;
(f) the lithium can be transferred from the amalgam into the solvent through exchange with salts of heavy metals;
(g) this solvent can be separated from water to a large extent by normal fractionating distillation.

It appears that the amines referred to do not show an azeotropic mixture with water and that they show a very wide distillation loop with water. The boiling point of propylamine is 48.5° C.

This combination of properties, which is extraordinarily favourable for the process to be applied was not known nor could it be foretold, as particularly the points c and d cannot be calculated. Neither was it possible to foretell the points e and f.

At atmospheric pressure, dimethyl formamide has a boiling point of 153° C. and in addition to this it cannot be rendered free of water by distillation. Therefore, when using dimethyl formamide, it is difficult to separate this solvent from the salt in the top section, so that, according to this prior art method, the salt-containing dimethyl formamide is diluted with water, after which this aqueous mixture is subjected to electrolysis while using a mercury cathode. However, when using this method, the liquid is contaminated by anodic oxidation of the dimethyl formamide, so that this has to be purified again before it is fit for recirculation.

When using propyl amine or isopropylamine, the separation factor of the lithium isotopes in the amine solvent appeared to us to be 1.05±0.02 (substantially equally large as that in dimethyl formamide). Surprisingly it was found that, when using amines, the lithium from the amalgam can be transferred into the solvent through exchange with auxiliary salts of heavy metals, as with amines the auxiliary metal does not precipitate in the solution, but is dissolved in the amalgam. This formation does not occur with many other organic solvents, such as, for instance, with dimethyl formamide, with primary alcohols and with dioxane.

The use of an amine solvent according to the present invention makes the continuous processing of both return circuits possible.

Figure 2:
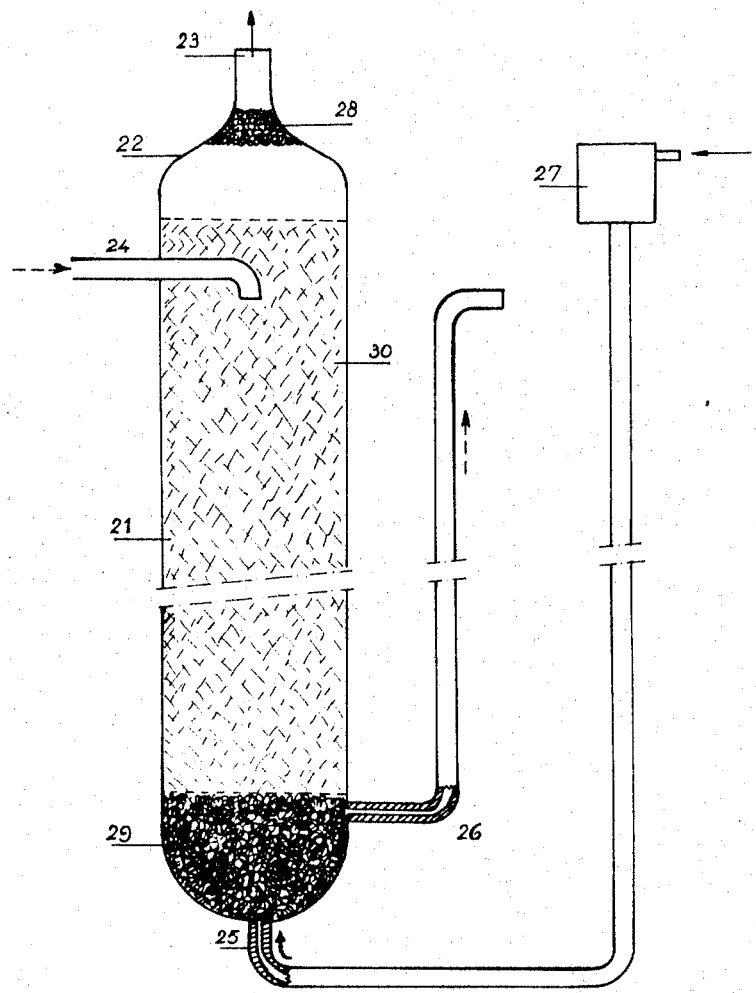

In the FIGURE 1 there is represented an embodiment of the process, whereas FIGURE 2 gives an example of a suitable exchange column.

In these figures, 1 is the exchange column, the bottom part 13 of which is used as the lower return circuit proper, owing to a solution of an auxiliary salt such as $CdBr_2$ or $CdCl_2$ being introduced into the bottom of the column. Instead of this, it is also possible for any other corresponding salt of a metal which is less base than lithium, such as $ZnBr_2$, $HgCl_2$ and the like, which salt is easily soluble in the amine, to be used. The salt of the less base metal is supplied to section 13 in a quantity slightly less than the equivalent quantity and is dissolved in the amine solvent. In this manner, the larger part of the lithium is exchanged against the more noble metal. The lithium residue which is still present in the amalgam bottom product, can be fully exchanged in the next relatively short exchange column 2 with an excess of a solution which is substantially saturated with the auxiliary salt supplied by a saturation column 5.

The concentration of the auxiliary salt in the solution, which is supplied to the bottom part 13 of the exchange column, is made independent of the amount of lithium, which is exchanged in column 2 by saturating the solution of the auxiliary salt coming from column 2 in a saturation column 4 by an intensive contact with solid salt. The saturated solution obtained in column 4 is diluted between columns 4 and 13 with pure solvent as needed to produce the required concentration of the auxiliary salt solution fed to column 13. In this manner a continuous amount of auxiliary salt is supplied which, in total, is exactly equivalent to the amount of lithium supplied.

The cadmium amalgam formed is thus cleared of the cadmium (or the other auxiliary metal present), by means of washing out with acid in a column 3. The aqueous solution of the auxiliary salt obtained in column 3 is evaporated in 10 after an excess of acid, if any, has been neutralized by the hydroxide of the auxiliary metal. The auxiliary salt regained in 10 is recycled to the sections 4 and 5.

Th purified mercury is conveyed to the electrolysis apparatus 9, where it is reconverted into lithium amalgam by means of electrolysis of an aqueous lithium solution, which is procured from the bottom section of the fractionating column 6.

The top section of the electrolyte-containing amine is now introduced into the fractionating column 6, the bottom section of which contains boiling water; the amine withdrawn at the top side near 7 as an anhydrous product. The whole of the lithium salt finds its way into the water. It is clear that this continuous transference of the lithium salt from the solvent into the water with the aid of a fractionating column is possible only if the solvent has a boiling point below 100° C., if the graphic representation of the system solvent-water shows a sufficiently wide vapour loop and if the solvent forms no azeotropic with water. The tetrahydrofuran mentioned in prior art, for instance, is not suitable for this purpose, because it forms an azeotropic with water.

So there are a separate mercury cycle, an amine cycle, a water cycle and an auxiliary salt cycle.

The bottom cycle of the exchange column 1 gives a substantially direct return with auxiliary circuit for the remaining lithium and an auxiliary salt cycle ( both to be carried out continuously); the top section gives an indirect return, which can also be carried out continuously. The quantity withdrawn per unit of time, will, in dependency on the separation desired, amount to between 0.1 and 20% of the quantity passing through an imaginary cross-section of one of the phases at the level of the point of introduction per unit of time. This means that from 99.9 to 80% of posite direction. It will be clear that, while using the known processes in which acid is employed, the recycling of 99.9% of the material is extremely difficult. Such as accurate dosing of the agent causing the return may be obtained without difficulty, if the method with the auxiliary salt is applied and the return is carried out in two sections in the way as described.

When the column is sufficiently long, a product having an enriched $Li^6$-content may be withdrawn at the lower side of the exchange column at 11 after some time, and near the bottom section 8 of the fractionating column 6 a product having an enriched $Li^7$-content may be withdrawn at 12. It is preferred to have the column adjust itself until a stationary condition has been reached. After this, the product is withdrawn at the points 11 and 12, care being taken for a quantity of unenriched lithium equal to the total quantity withdrawn to be supplied to a point in the column, where the concentration in lithium-6 approximately equals the concentration in unenriched lithium.

The exchange column 1 may be a liquid column, in which fine mercury droplets drop down. A much more effective exchange is obtained, however, if a column filled with grain-form inert material is used, such as sand having a grain cross-section of about 0.1 to 1.5 mm. diameter and preferably of between 0.2 and 0.5 mm. in diameter. Such a column renders a much higher plate number than the one mentioned first. It was found from experiments that an amalgam in a solution is not readily transported in counterflow through a column full of filling agent. A suitable filling agent was found (the granulated inert material mentioned before) and a method was elaborated for realizing a homogeneous distribution of the two phases in a column filled with such a filling agent. To start the counterflow, it appeared to be necessary to fill the free volume of the sand-filled column completely with mercury. The desired homogeneous distribution of the two phases could be obtained by subsequently replacing part of the mercury by the solvent. An embodiment of such a column is represented in FIG. 2. It comprises the column body proper 21, provided with a tightly fitting cover 22. The amalgam is supplied at 24 and withdrawn at 26. The electrolyte solution is supplied at 25 and withdrawn at 23. A liquid pump is indicated diagrammatically at 27. At 28 and 29, wads of a filtering substance such as glass wool are provided to hold back the sand.

In order to bring this column into operation, it is first filled up with the electrolyte liquid, the mercury being subsequently admitted from above, by which the electrolyte liquid is largely expelled again. As soon as the mercury flows away at the lower side, the electrolyte substance too can be conveyed in counterflow to the mercury with the aid of a pump, both liquids continuing to flow through the many narrow channels in counterflow and in close contact with each other.

Advantageously, a number of these columns, each having a length of 1 to 5 metres and a diameter of from 2 to 20 cm., are connected in series. In order to achieve large capacities, it is also possible to connect a number of these columns or series of columns in parallel.

What we claim is:

1. A process for enriching lithium isotopes by selective distribution into two liquids which are in contact with each other, wherein the selective distribution is carried out in an apparatus comprising an exchange column containing lithium amalgam in contact with a solution of a lithium halide in at least one organic amine solvent having a boiling point below 100° C., a return circuit at the upper end of the column in which section the lithium halide is transferred from the amine solution into an aqueous solution and subsequently converted by electrolysis into lithium amalgam, and a bottom return circuit which includes the lower end of the exchange column in which circuit the lithium is transferred from the amalgam into the organic amine solvent by countercurrent ion exchange with an auxiliary halide salt, of a metal which is less basic than lithium and wherein the auxiliary salt is supplied to the exchange column in a quantity slightly below the equivalent quantity of the lithium supplied to the column, part of the amalgam enriched in one isotope is withdrawn from the return circuit before complete transfer of the lithium from the amalgam to the organic amine solvent in the circuit.

2. A process according to claim 1 wherein the lithium salt which is withdrawn at the upper end of the exchange column as a solution in the amine solvent, is continuously transferred from the amine solvent into water with the aid of a fractionating column by mixing it with water and stripping off the amine solvent.

3. A process according to claim 1 wherein the return circuit includes two sections, in one of which, constituted by the lower end of the exchange column the lithium amalgam is firstly brought into contact with a quantity slightly less than the equivalent quantity of the auxiliary salt dissolved in the amine solvent and in the other of which the amalgam is contacted with an excess of a substantially saturated solution of the auxiliary salt, the solution of the auxilary salt being passed between the two sections of the return circuit through a saturation section in which solid auxiliary salt is present, and subsequently being diluted to the concentration required, by controlled addition of amine solvent.

4. A process as claimed in claim 1 wherein the amine solvent is propyl amine.

5. A process as claimed in claim 1 wherein the amine solvent is isopropyl amine.

6. A process according to claim 1 wherein an exchange column is used, which is filled with a granular inert material having a grain diameter of between 0.1 and 1.5 mm.

References Cited

UNITED STATES PATENTS

| 2,204,072 | 6/1940 | Dean | 23—50 X |
| 3,105,737 | 10/1963 | Saito | 23—89 |

FOREIGN PATENTS

| 222,836 | 7/1959 | Australia. |
| 560,137 | 7/1958 | Canada. |

OTHER REFERENCES

Lewis et al.: "Journal of American Chemical Soc.," vol. 58, December 1936, pp. 2519–2524.

EARL C. THOMAS, Primary Examiner

H. T. CARTER, Assistant Examiner

U.S. Cl. X.R.

23—50; 203—5

UNITED STATES PATENT OFFICE
CERTIFICATE OF CORRECTION

Patent No. 3,463,606                                  August 26, 1969

Wilhelm Matthijs Smit et al.

It is certified that error appears in the above identified patent and that said Letters Patent are hereby corrected as shown below:

Column 3, after line 75, insert -- the material is recycled to the column by return in the op- --.

Signed and sealed this 3rd day of March 1970.

(SEAL)
Attest:

Edward M. Fletcher, Jr.                            WILLIAM E. SCHUYLER, JR.
Attesting Officer                                         Commissioner of Patents